United States Patent
Kim et al.

(10) Patent No.: US 7,286,558 B2
(45) Date of Patent: Oct. 23, 2007

(54) METHOD AND DEVICE FOR TRANSMITTING/RECEIVING DATA RATE INFORMATION IN A MOBILE COMMUNICATION SYSTEM

(75) Inventors: Youn-Sun Kim, Seoul (KR); Ho-Kyu Choi, Songnam-shi (KR); Hwan-Joon Kwon, Seoul (KR); Jae-Yoel Kim, Kunpo-shi (KR)

(73) Assignee: Samsung Electronics Co., Ltd. (KR)

( * ) Notice: Subject to any disclaimer, the term of this patent is extended or adjusted under 35 U.S.C. 154(b) by 1089 days.

(21) Appl. No.: 10/109,768

(22) Filed: Mar. 29, 2002

(65) Prior Publication Data

US 2002/0191570 A1    Dec. 19, 2002

(30) Foreign Application Priority Data

Mar. 29, 2001 (KR) ............. 10-2001-0016651
May 16, 2001 (KR) ............. 10-2001-0026802

(51) Int. Cl.
*H04J 3/22* (2006.01)
*H04J 13/02* (2006.01)
*H04B 7/216* (2006.01)

(52) U.S. Cl. .................... 370/465; 370/479; 370/335

(58) Field of Classification Search ........... 370/335, 370/342, 441, 468, 465, 231, 232, 235, 230, 370/479
See application file for complete search history.

(56) References Cited

U.S. PATENT DOCUMENTS

| | | | |
|---|---|---|---|
| 6,421,336 B1* | 7/2002 | Proctor et al. | 370/342 |
| 6,735,185 B1* | 5/2004 | Noneman | 370/335 |
| 2002/0064145 A1* | 5/2002 | Khare et al. | 370/342 |
| 2003/0218997 A1* | 11/2003 | Lohtia et al. | 370/335 |
| 2004/0218570 A1* | 11/2004 | Black et al. | 370/335 |
| 2005/0141463 A1* | 6/2005 | Ando | 370/335 |

\* cited by examiner

*Primary Examiner*—Doris H. To
*Assistant Examiner*—Feben Micael Haile
(74) *Attorney, Agent, or Firm*—The Farrell Law Firm, P.C.

(57) ABSTRACT

There are provided a method and device for transmitting/receiving reverse data rate information in a mobile communication system supporting multimedia service applications including voice and data services. According to the present invention, upon receipt of information about the maximum data rate of an SCH, a mobile station determines the minimum number of bits to be assigned to the reverse data rate information according to the number of data rates less than or equal to the maximum data rate and then transmits the reverse data rate information with the minimum number of bits to a base station.

14 Claims, 6 Drawing Sheets

METHOD AND DEVICE FOR TRANSMITTING/RECEIVING DATA RATE INFORMATION IN A MOBILE COMMUNICATION SYSTEM

PRIORITY

This application claims priority to an application entitled "Method and Device for Transmitting/Receiving Data Rate Information in a Mobile Communication System" filed in the Korean Industrial Property Office on Mar. 29, 2001 and assigned Serial No. 2001-16651, and to an application entitled "Method and Device for Transmitting/Receiving Data Rate Information in a Mobile Communication System" filed in the Korean Industrial Property Office on May 16, 2001 and assigned Serial No. 2001-26802, the contents of both of which are hereby incorporated by reference.

BACKGROUND OF THE INVENTION

1. Field of the Invention

The present invention relates generally to a mobile communication system that supports multimedia service applications including voice and data, and in particular, to a method and device for transmitting/receiving reverse data rate information.

2. Description of the Related Art

A typical mobile communication system, for example, a CDMA (Code Division Multiple Access) system based on IS-95 supports only voice service. Along with an increasing user demand for data communication and the development of mobile communication technology, the mobile communication system has been evolved to support data service. HDR (High Data Rate), for example, was proposed to support only high-rate data service.

The existing mobile communication systems have been deployed such that voice service and data service are considered separately. Due to an ever increasing demand for contemporaneous delivery of voice and data, the mobile communication technology has reached a position in which we should explore a mobile communication system capable of supporting voice and data services simultaneously. To meet this demand, a so-called 1xEV-DV (Evolution Data and Voice) system has been proposed recently.

The 1xEV-DV mobile communication system enables data transmission on both directions, forward and reverse. In this system, a mobile station transmits reverse data on an SCH (Supplemental channel) to a base station, along with information about the data rate of the SCH on an R-RICH (Reverse Rate Indicator Channel).

Figure 1:
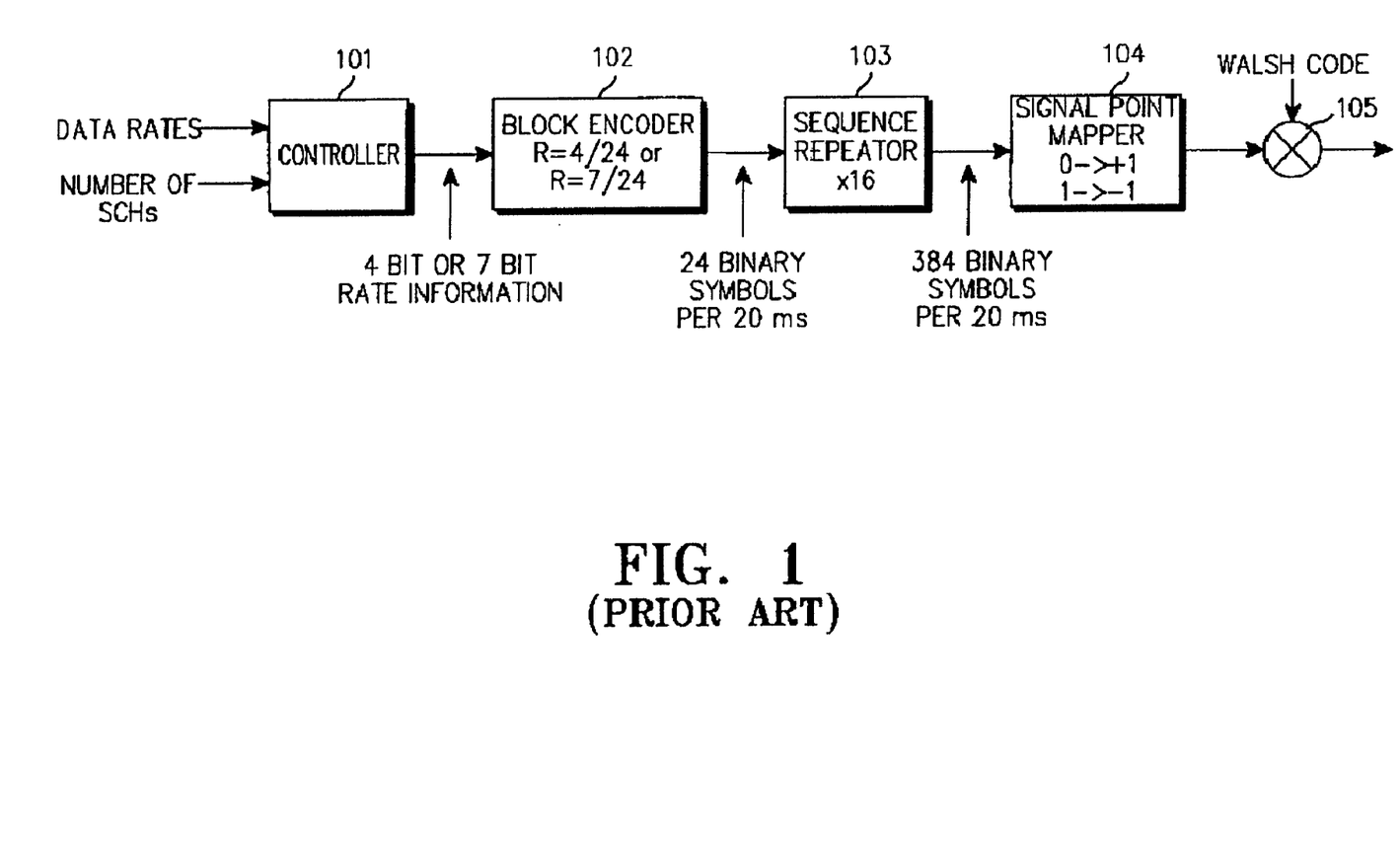
FIG. 1 is a block diagram of a conventional data rate information transmitter.

FIG. 1 is a block diagram of a conventional reverse data rate information transmitter. The transmitter transmits an R-RICH sequence representing the data rate of a reverse SCH from a mobile station to a base station in the 1xEV-DV mobile communication system, for example.

Referring to FIG. 1, a total of four or seven bits are assigned to an R-RICH sequence to indicate a reverse data rate. Information about the number of SCHs to be used for the mobile station and a set of data rates for each SCH is fed to a controller 101. Then, the controller 101 determines a mapping relation between R-RICH sequence values and the reverse SCH data rates. If up to two SCHs are used, two mapping relations can be set for the case of using one SCH and for the case of using two SCHs. After the mapping, the controller 101 outputs a 4-bit R-RICH sequence in the case of the one SCH, and a 7-bit R-RICH sequence in the case of two SCHs. The code rate of an encoder 102 varies depending on the number of bits assigned to the R-RICH sequence. Code rates of 4/24 and 7/24 are applied respectively to the four-bit R-RICH sequence and the seven-bit R-RICH sequence. In other words, the encoder 102 outputs 24 code symbols regardless of the number of bits of the R-RICH sequence. A sequence repeater 103 repeats the 24-code symbol sequence 15 times (i.e., 16 code symbol sequences occur). A signal point mapper 104 converts the 0s and 1s of 384 code symbols (24 code symbols×16) to +1s and −1s, respectively. A Walsh spreader 105 spreads the 384 code symbols received from the signal point mapper 104 with a predetermined Walsh code of length 64 assigned to the R-RICH. The spread signal is transmitted to the base station in a 20-ms reverse frame.

Table 1 below shows conventional mapping between data rates and R-RICH sequence values when one SCH is used for reverse data transmission. The data rates are listed in an ascending order and 4-bit R-RICH sequence values ranging from 0000 to 1000 are sequentially assigned to the data rates.

TABLE 1

| data rate (kbps) | R-RICH sequence |
| --- | --- |
| 0 | 0000 |
| 9.6 | 0001 |
| 19.2 | 0010 |
| 38.4 | 0011 |
| 76.8 | 0100 |
| 153.6 | 0101 |
| 307.2 | 0110 |
| 614.4 | 0111 |
| 1024 | 1000 |

Figure 2:
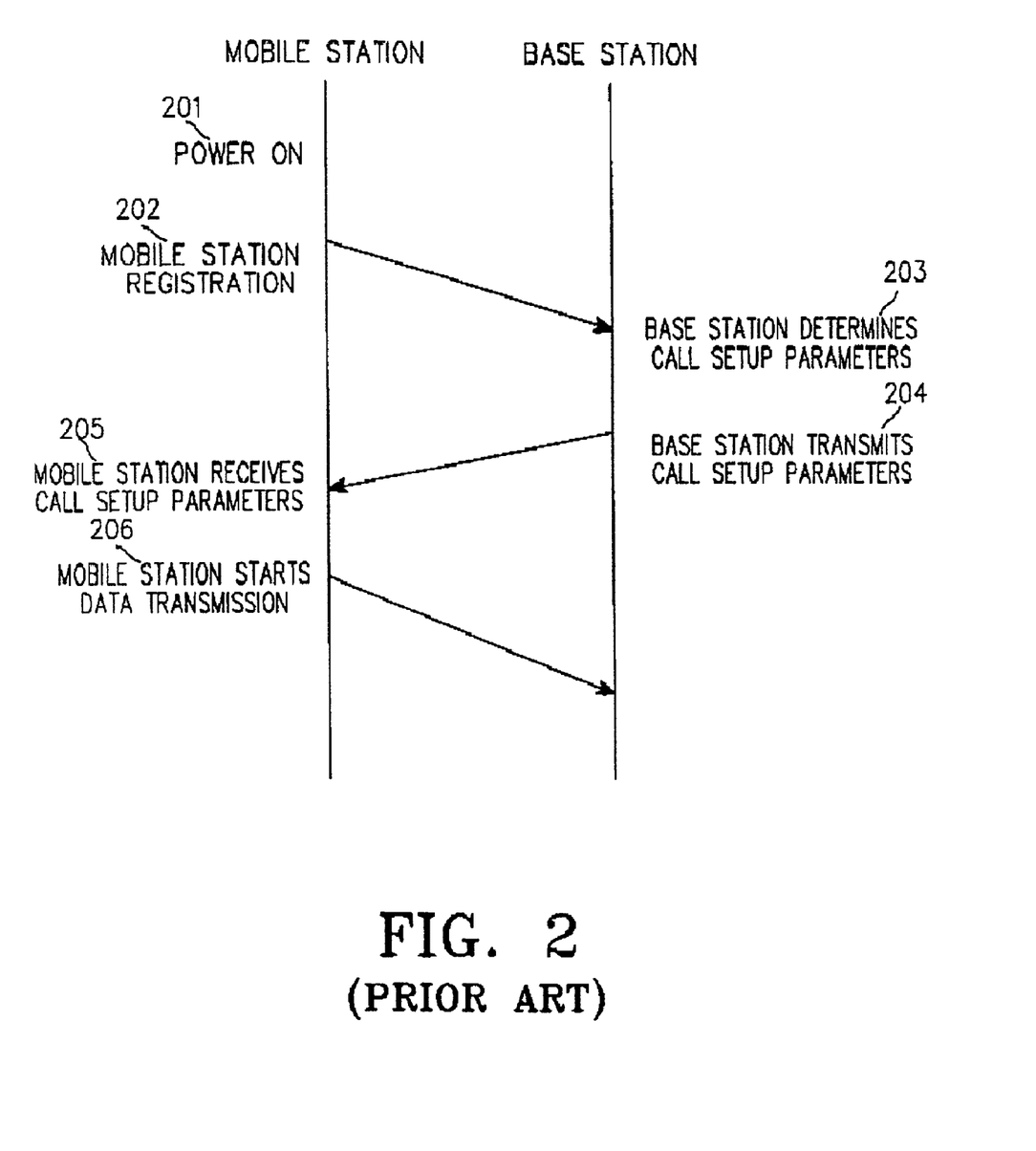
FIG. 2 is a diagram illustrating a signal flow between a mobile station and a base station in a typical call setup procedure.

FIG. 2 is a diagram illustrating a signal flow between a mobile station and a base station in a typical call setup procedure.

Referring to FIG. 2, a call setup starts with power-on in the mobile station in step 201. The mobile station notifies a wireless network of its presence by mobile station registration and transmits signaling information to the base station in step 202. The base station determines call setup parameters needed for the mobile station to operate over the wireless network in step 203. The call setup parameters include the number of SCHs to be used for the mobile station and the maximum data rate of each SCH, which are determined considering the type and characteristics of the mobile station, the type of a service to be provided, and the condition of the wireless network. The base station transmits the call setup parameters to the mobile station in step 204. Upon receipt of the call setup parameters in step 205, the mobile station starts to transmit traffic data.

The conventional R-RICH transmitter shown in FIG. 1 considers only the number of SCHs to be used for the mobile station, excluding the maximum data rate of each SCH, in determining the number of bits to be assigned to an R-RICH sequence and the mapping relation between R-RICH sequences and data rates (or data rate combinations). For example, if one SCH is to be used for reverse data transmission, mapping between a particular data rate and an R-RICH sequence is carried out regardless of the maximum data rate of the SCH, as shown in Table 1. The maximum data rate of each SCH can be transmitted by a signaling message at a call setup as shown in FIG. 2, or it can be reset by the signaling message after a call is connected.

A drawback of the conventional R-RICH sequence bit number determining method is that a predetermined number of bits are assigned to the R-RICH sequence even if the number of available data rates is limited by the maximum data rate of each SCH. For example, if one SCH is used and its maximum data rate is 38.4 kbps in Table 1, the mobile station transmits data at or below 38.4 kbps. Therefore, the R-RICH sequence is one of 0000, 0001, 0010, and 0011. Though the four available data rates can be represented in two bits, an extra two bits are additionally assigned. This implies that the encoder 102 encodes data at a code rate 4/24 though a code rate of 2/24 is enough.

SUMMARY OF THE INVENTION

In general, as a code rate is decreased by reducing the number of bits of an R-RICH sequence on the condition that the number of code symbols output from an encoder is not changed, the minimum distance of a block code is increased. As a result, required transmission power to satisfy predetermined performance can be saved. On the contrary, transmission of four bits in a situation where two bits are enough deteriorates performance and causes unnecessary transmission power consumption.

It is, therefore, an object of the present invention to provide a method and device for transmitting/receiving reverse data rate information in a mobile communication system that supports voice and packet data services simultaneously.

It is another object of the present invention to provide a method and device for transmitting reverse data rate information with less bits in a mobile communication system that supports voice and packet data services simultaneously.

It is a further object of the present invention to provide a method and device for encoding reverse data rate information at a reduced code rate if the number of possible data rate in reverse link is reduced in a mobile communication system that supports voice and packet data services simultaneously.

The foregoing and other objects of the present invention are achieved by providing a method and device for transmitting and/or receiving reverse data rate information in a mobile communication system supporting multimedia service applications including voice and data services. According to the present invention, upon receipt of information about maximum data rates of SCHs, a mobile station determines the minimum number of bits to be assigned to the reverse data rate information according to a number of possible data rates and then transmits the reverse data rate information with the minimum number of bits to a base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 3:
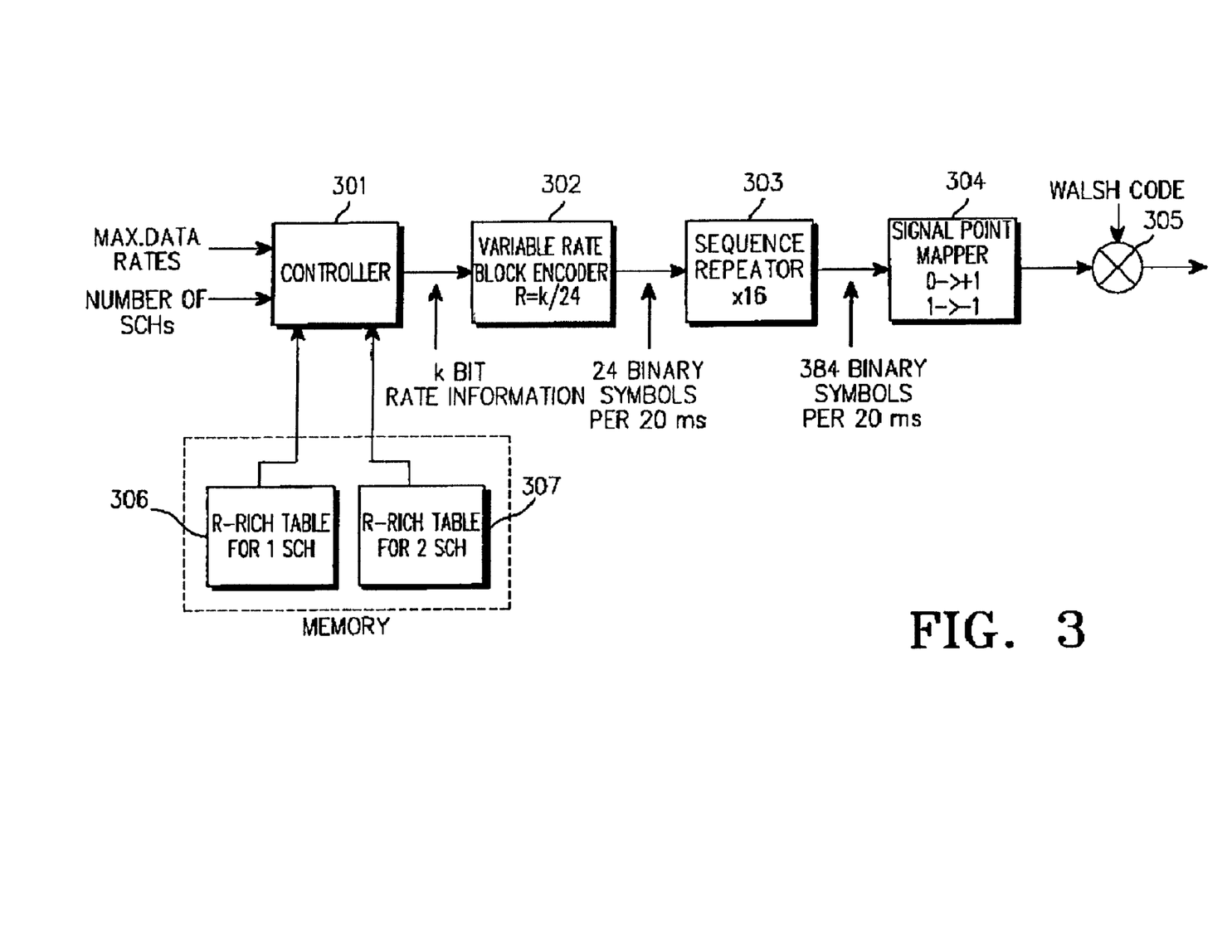
FIG. 3 is a block diagram of a data rate information transmitter according to an embodiment of the present invention.

FIG. 3 is a block diagram of a mobile station device for transmitting reverse data rate information on an R-RICH in a 1xEV-DV system according to an embodiment of the present invention.

The R-RICH is a channel that transmits information about the data rate of a reverse SCH to a base station. The base station recovers the original data received from a mobile station by obtaining information about the presence of data or the absence of data, modulation, and channel encoding through recovery of an R-RICH received from the mobile station. A method of transmitting/receiving an R-RICH according to the present invention is also applicable to systems other than 1xEV-DV.

Referring to FIG. 3, the mobile station receives information regarding its available maximum data rate from the base station and the data rate information transmitter in the mobile station transmits reverse data rate information in relation to the maximum data rate to the base station. A controller 301 determines the number of available data rates less than or equal to the maximum data rate based on the received reverse data rate information referring to a set of data rates stored in a memory table 306 or 307 and then determines a number of bits for an R-RICH sequence based on the number of available data rates. The bit number is a minimum integer determined by the number of the available data rates. The controller 301 maps the available data rates to R-RICH sequences each having the number of bits. The number of available data rates and the number of bits of the R-RICH sequence are in the relation expressed as equation (1). An encoder 302 encodes the R-RICH sequence with the number of bits representing a reverse data rate to be used at a code rate, which is determined by the number of bits. The R-RICH sequence is encoded at each reverse data transmission. Though not shown, the mobile station device according to the embodiment of the present invention further includes a receiver for receiving information about the number of reverse SCHs to be used and the maximum data rate of each SCH from the base station.

To represent the data rate of a reverse SCH, k bits are assigned to an R-RICH sequence. On the basis of information regarding the number of SCHs to be used and the maximum data rate of each SCH, the controller 301 determines a mapping relation between R-RICH sequences and available reverse SCH data rates. The memory tables 306 and 307 list a set of data rates in the case of using one SCH and a set of data rate combinations in the case of using two SCHs, respectively. For example, if one SCH is used and its maximum data rate is 38.4 kbps in Table 1, four data rates are available for transmission of the SCH and so two bits are assigned to the R-RICH sequence. If m data rates are available for an SCH, then $$k=\lceil log_2(m) \rceil \quad (1)$$

where m is the number of data rates less than or equal to a given maximum data rate for the SCH among a set of data rates, k is the minimum number of bits to be assigned to the R-RICH sequence, and $\lceil a \rceil$ represents the operation of obtaining a minimum integer greater than or equal to a.

The above equation works with two SCHs as well as with one SCH. If two SCHs are used, m is the number of all possible combinations of data rates available for the two SCHs. For example, for two SCHs with maximum data rates of 9.6 kbps and 38.4 kbps in Table 1, the number of all possible data rate combinations is 8 (first two SCHs×second four SCHs). Hence, m=8 and k=3 according to equation (1).

The reason of adjusting the number of bits of the R-RICH sequence using equation (1) is to minimize the R-RICH sequence bit number according to the amount of transmission information so that the R-RICH sequence is coded at a minimum code rate and thus performance is improved. The encoder 302 in FIG. 3 encodes the R-RICH sequence received from the controller 301 at a code rate R=k/n (e.g., n=24). The parameter k ranges from 1 to 7 because the number of bits of the R-RICH sequence depends on the number of SCHs and the maximum rates of the SCHs, in which the present invention differs from the conventional data rate information transmission method. The sequence repeater 303 repeats the R-RICH code symbol sequence predetermined times (e.g., 15 times). The signal point mapper 304 maps the 0s and 1s of the 384(=24×16) repeated R-RICH code symbols to +1s and −1s, respectively. The Walsh spreader 305 spreads the 374 code symbols received from the signal point mapper 304 with a Walsh code of, for example, length 64 assigned to the R-RICH. The spread signal is transmitted in a reverse frame of 20 ms in duration. An orthogonal spreader may substitute for the Walsh spreader 305 to orthogonally spread the code symbols output from the signal point mapper 304.

The data rate information transmission according to the embodiment of the present invention depicted in FIG. 3 differs from the conventional data rate information transmission depicted in FIG. 1 in that (1) the number of bits assigned to an R-RICH sequence is determined by the number of SCHs in the conventional technology, while it is determined by the number of available data rates for one SCH or the number of all possible combinations of data rates available for two SCHs in the present invention, and (2) the R-RICH sequence and a particular data rate or a combination of data rates is in a fixed mapping relation, and once the number of SCHs is determined, a corresponding mapping relation is set regardless of the number of available data rates/data rate combinations for the SCHs in the conventional technology, while the mapping relation is variable depending on the number of available data rates/data rate combinations for SCHs in the present invention. That is, the number of bit of the R-RICH sequence and the number of available data rates/data rate combinations are in a variable mapping relation.

Figure 6:
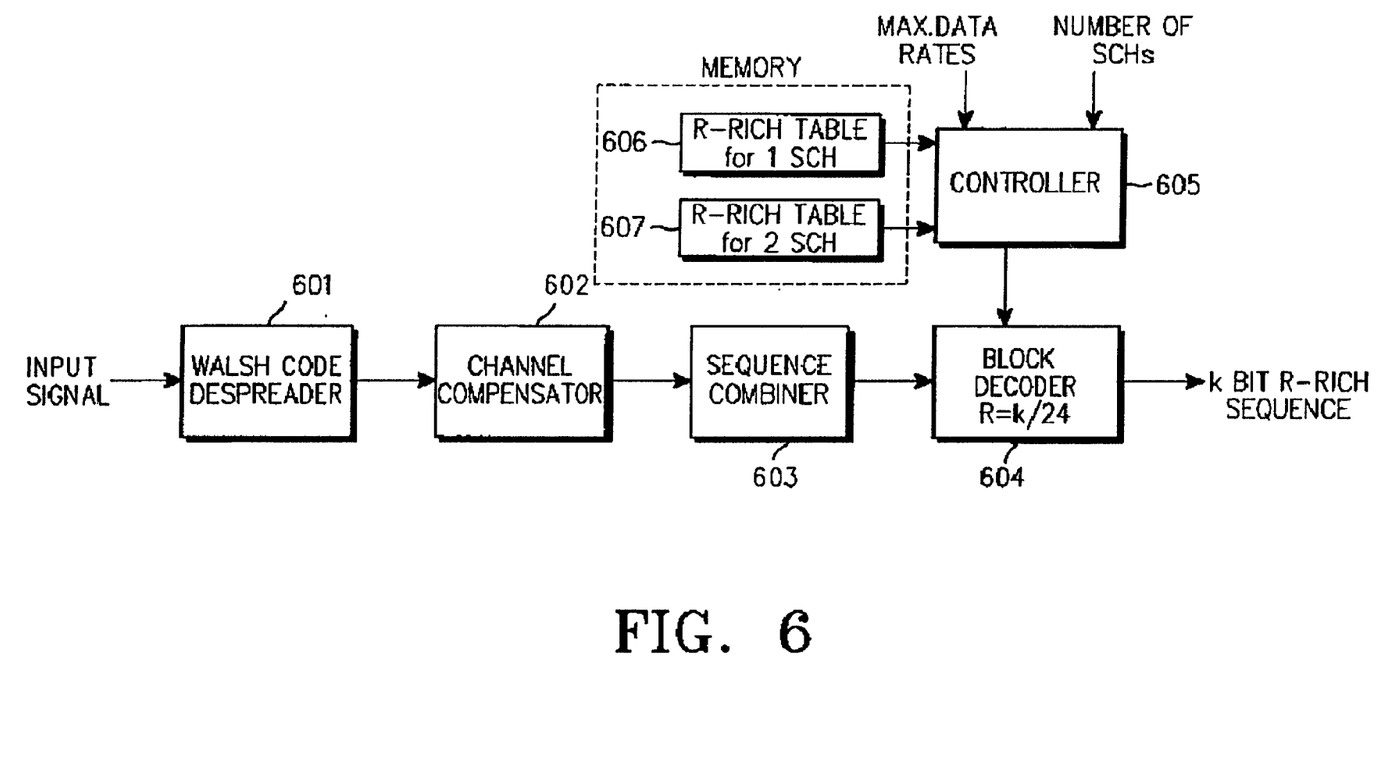
FIG. 6 is a block diagram of a data rate information receiver according to the embodiment of the present invention.

FIG. 6 is a block diagram of a base station device for receiving data rate information, particularly an R-RICH channel receiver according to the embodiment of the present invention.

Referring to FIG. 6, after PN (Pseudorandom Noise) despreading, a Walsh despreader 601 despreads an input signal with a predetermined Walsh code. A channel compensator 602 channel-compensates the despread signal and a sequence combiner 603 combines the sequences that were repeated predetermined times (e.g., 15 times) in a transmitter. A decoder 604 decodes the combined sequence with a code rate R=k/n (e.g., n=24). A controller 605 determines the number of bits of an R-RICH sequence, k according to the number of SCHs used for a corresponding mobile station and the maximum data rate of each of the SCHs. The controller 605 also sets a mapping relation between R-RICH sequence values and the data rates of the SCHs based on the number of the SCHs and the maximum data rate of each SCH. Tables 606 and 607 list a set of data rates for one SCH and a set of data rate combinations for two SCHs, respectively. The same mapping relation between the R-RICH sequences and the data rates/data rate combinations is applied to both the mobile station and the base station shown in FIGS. 3 and 6.

The base station device of FIG. 6 is designed to receive data rate information from the mobile station. The controller 605 determines the number of data rates less than or equal to the maximum data rate of an SCH available to the mobile station from the memory tables 606 or 607 having a set of data rates and determines the number of bits of the R-RICH sequence according to the number of the available data rates. The number m of the data rates and the number of bits k of the R-RICH sequence are determined by equation (1) as described before. The controller 605 maps the data rates to R-RICH sequence values, each having the number of bits. The receiver decodes an R-RICH sequence received from the mobile station at a code rate determined by the number of bits of the R-RICH sequence.

Though not shown, the base station device according to the embodiment of the present invention further includes a receiver for receiving a registration message from the mobile station and a transmitter for transmitting information about the number of available SCHs and the maximum data rate of each SCH to the mobile station.

Table 2 below lists data rates versus R-RICH sequence values when one SCH is used for reverse data transmission according to the embodiment of the present invention.

TABLE 2

| SCH data rate | Data rate availability | R-RICH sequence (conventional) | R-RICH sequence (the present invention) |
|---|---|---|---|
| 0 kbps | available | 000 | 00 |
| Data rate A | available | 001 | 01 |
| Data rate B | available | 010 | 10 |
| Data rate C | available | 011 | 11 |
| Data rate D | not available | 100 | — |
| Data rate E | not available | 101 | — |
| Data rate F | not available | 110 | — |
| Data rate G | not available | 111 | — |

In Table 2, all available data rates for the SCH are listed in the first column. A total of eight data rates ranging from 0 kbps to data rate G are given for the SCH and the maximum data rate of the SCH is data rate C, by way of example. The data rates should be enumerated in the same way in both the mobile station and the base station. Here, the data rates are arranged in an ascending order. The second column contains information about whether each data rate is available or not. In the third column, the data rates are mapped to corresponding R-RICH sequences. In the conventional technology, although four data rates are available for a maximum data rate of data rate C, three bits are assigned to the R-RICH sequence in view of the number of all the data rates (i.e., 8). Meanwhile, the number of available data rates is first determined in the present invention. In Table 2, four data rates are available and two bits are assigned to the R-RICH sequence by equation (1). The rightmost column includes R-RICH sequence values mapped to the available data rates with present invention. An arbitrary mapping relation can be set between the data rates and the R-RICH sequence values as long as it is applied to both the mobile station and the base station.

In Table 2, the number of bits of the R-RICH sequence and the mapping relation between the available data rates and the R-RICH sequence values depend on the maximum data rate of the SCH. If the maximum data rate is data rate C, the 2-bit R-RICH sequences are mapped to corresponding data rates. In real application, the maximum data rate can be determined during call set-up or changed after the call set-up.

Table 3 below lists data rates versus R-RICH sequence values when two SCHs are used for reverse data transmission according to the embodiment of the present invention.

TABLE 3

| Data rates for SCH 1 | Data rates for SCH 2 | Data rate availability | R-RICH sequence (conventional) | R-RICH sequence (the present invention) |
|---|---|---|---|---|
| 0 kbps | 0 kbps | available | 0000 | 000 |
| 0 kbps | Data rate A | available | 0001 | 001 |
| 0 kbps | Data rate B | not available | 0010 | — |
| 0 kbps | Data rate C | not available | 0011 | — |
| Data rate A | 0 kbps | available | 0100 | 010 |
| Data rate A | Data rate A | available | 0101 | 011 |
| Data rate A | Data rate B | not available | 0110 | — |
| Data rate A | Data rate C | not available | 0111 | — |
| Data rate B | 0 kbps | available | 1000 | 100 |
| Data rate B | Data rate A | available | 1001 | 101 |
| Data rate B | Data rate B | not available | 1010 | — |
| Data rate B | Data rate C | not available | 1011 | — |
| Data rate C | 0 kbps | available | 1100 | 110 |
| Data rate C | Data rate A | available | 1101 | 111 |
| Data rate C | Data rate B | not available | 1110 | — |
| Data rate C | Data rate C | not available | 1111 | — |

In Table 3, all available data rates for SCH 1 and SCH 2 are listed in the first and second columns, respectively. In reality, a Walsh code and modulation applied to each SCH should be considered in determining all available data rates in the 1xEV-DV system. If orthogonality is not maintained between SCH 1 and SCH 2 due to their Walsh codes and modulation methods, a corresponding data rate combination is not available. Table 3 was made on the assumption that four data rates including 0 kbps are set for SCH1 and SCH 2 and the maximum data rates of SCH 1 and SCH 2 are data rate C and data rate A, respectively. The data rates can be enumerated in an arbitrary but the same manner for both the mobile station and the base station. The third column in Table 3 indicates whether each data rate combination is available or not and the fourth column lists R-RICH sequences mapped to all possible data rate combinations in the conventional method. Since four data rates are available for SCH 1 and two data rates are available for SCH 2, a total of eight data rate combinations are produced. All possible data rate combinations, that is, 16 data rate combinations are generated and four bits are assigned to the R-RICH sequence in the conventional method. On the other hand, the number of available data rate combinations is first determined in the present invention. In Table 3, eight data rate combinations are available and three bits are assigned to the R-RICH sequence by equation (1). The rightmost column in Table 3 includes R-RICH sequence values mapped to the available data rate combinations. An arbitrary mapping relation can be set between the data rate combinations and the R-RICH sequence values as long as it is applied to both the mobile station and the base station.

In Table 3, the number of bits of the R-RICH sequence and the mapping relation between the available data rate combinations and the R-RICH sequence values depend on the maximum data rates of SCH 1 and SCH 2. In real application, the maximum data rates can be determined during call set-up or changed after the call set-up.

The memory tables 306 and 307 shown in FIG. 3 contain the data rates in the first column of Table 2 and the data rates in the first and second columns of Table 3, respectively. The controller 301 determines the number of available data rates/data rate combinations based on the number of SCHs and given data rates for each SCH and then the number of bits to be assigned to an R-RICH sequence. The controller 301 maps the available data rates/data rate combinations to R-RICH sequences.

Figure 4:
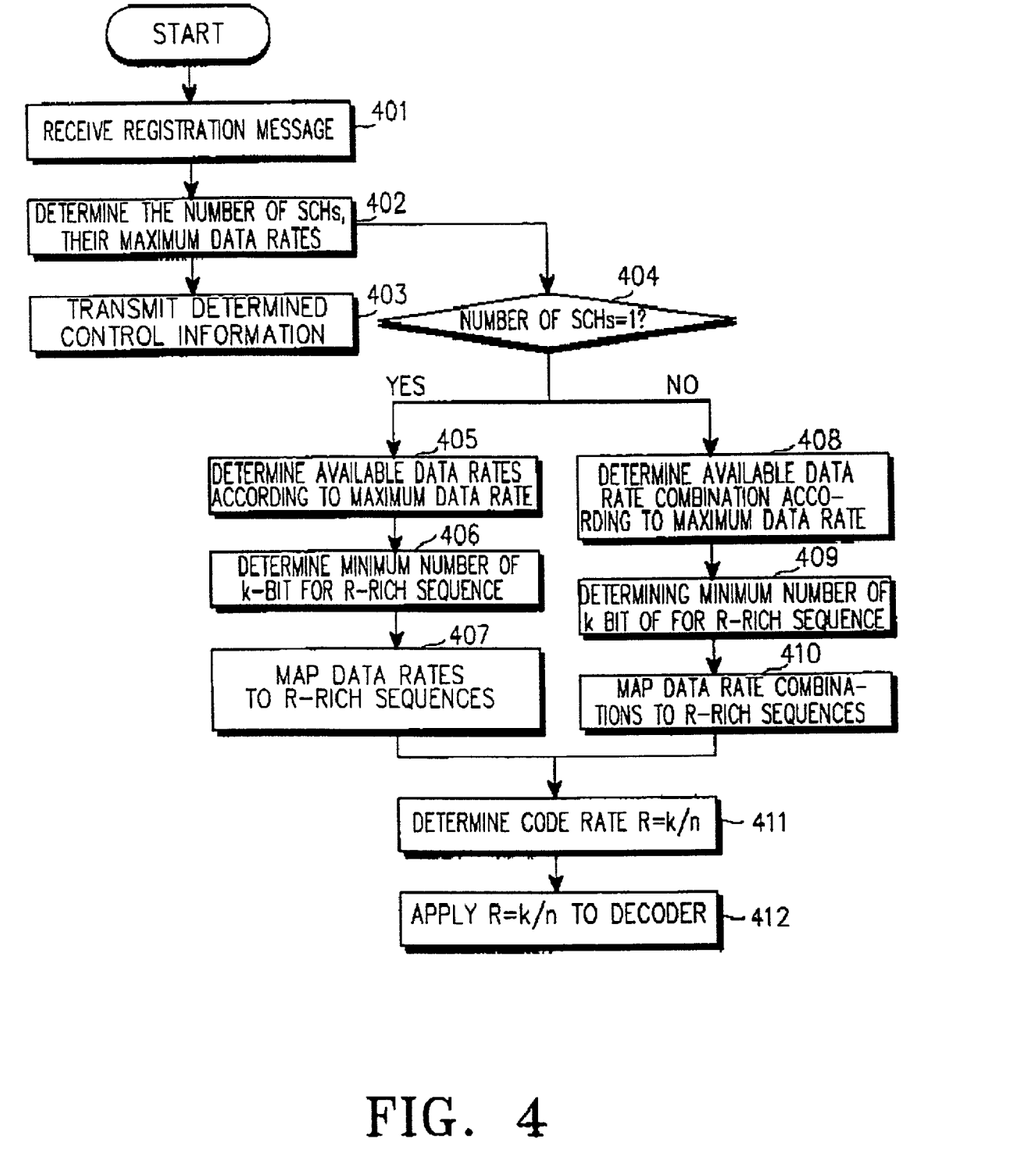
FIG. 4 is a flowchart illustrating a data rate information receiving procedure in a base station according to the embodiment of the present invention.

FIG. 4 is a flowchart illustrating a procedure for receiving data rate information in a base station according to the embodiment of the present invention. How the base station determines the number of bits of an R-RICH sequence and maps available data rates for an SCH to R-RICH sequences will be described referring to FIG. 4. This procedure is performed mainly by the controller 605 shown in FIG. 6.

Referring to FIG. 4, the base station receives a mobile registration message from a mobile station in step 401. The mobile registration message contains information about the mobile station like the type of the mobile station and the type of a requested service. In step 402, the base station determines the number of SCHs to be assigned to the mobile station and a maximum data rate for each SCH based on the received information such as mobile station's buffer size and other information such as reverse link load. The determined control information is transmitted to the mobile station by an SCH assignment message in step 403.

If it is determined that a single SCH is assigned to the mobile station in step 404, the base station determines data rates available to the SCH in step 405. The data rates are less than or equal to the maximum data rate of the SCH. For example, eight data rates including 0 kbps are set for the single SCH in Table 2. Here, given data rate C as the maximum data rate, four data rates, 0 kbs and data rates A, B and C are available to transmit the SCH. In step 406, the base station determines the minimum number of bits for an R-RICH sequence based on the number of available data rates for the SCH by equation (1). In Table 2, at least two bits are assigned to the R-RICH sequence. The base station maps 2-bit R-RICH sequences to the available data rates in step 407.

In Table 2, two bits are assigned to each R-RICH sequence to represent four available data rates. The R-RICH sequences 00, 01, 10 and 11 are mapped to the available data rates 0 kbps, data rate A, data rate B and data rate C, respectively. While the data rates are arranged in an ascending order and the R-RICH sequences range from 00 to 11, sequentially in Table 2, data rate arrangement and R-RICH sequence-data rate mapping can be carried out in any other manner if it is preset between the mobile station and the base station.

If it is determined that two SCHs are assigned to the mobile station in step 404, the base station determines available data rate combinations in step 408. The data rates in combination are less than or equal to the maximum data rates of the SCHs. For example, eight data rates are set for each SCH in Table 3. Here, given data rate C and data rate A as the maximum data rates, eight data rate combinations are available to transmit the SCHs. In step 409, the base station determines the minimum number of bits of an R-RICH sequence based on the number of available data rate combinations by equation (1). In Table 3, at least three bits are assigned to the R-RICH sequence. The base station maps 3-bit R-RICH sequences to the available data rate combinations in step 410.

In Table 3, three bits are assigned to each R-RICH sequence to represent eight available data rate combinations listed in the third column. The R-RICH sequences ranging from 000 to 111 are mapped to the available data rate combinations, respectively. Data rate arrangement and R-RICH sequence-data rate mapping can be carried out in any manner if it is preset between the mobile station and the base station.

In step 411, the base station determines a code rate according to the number of bits of the R-RICH sequence. The decoder 604 decodes a received R-RICH sequence at the determined code rate R=k/n.

Figure 5:
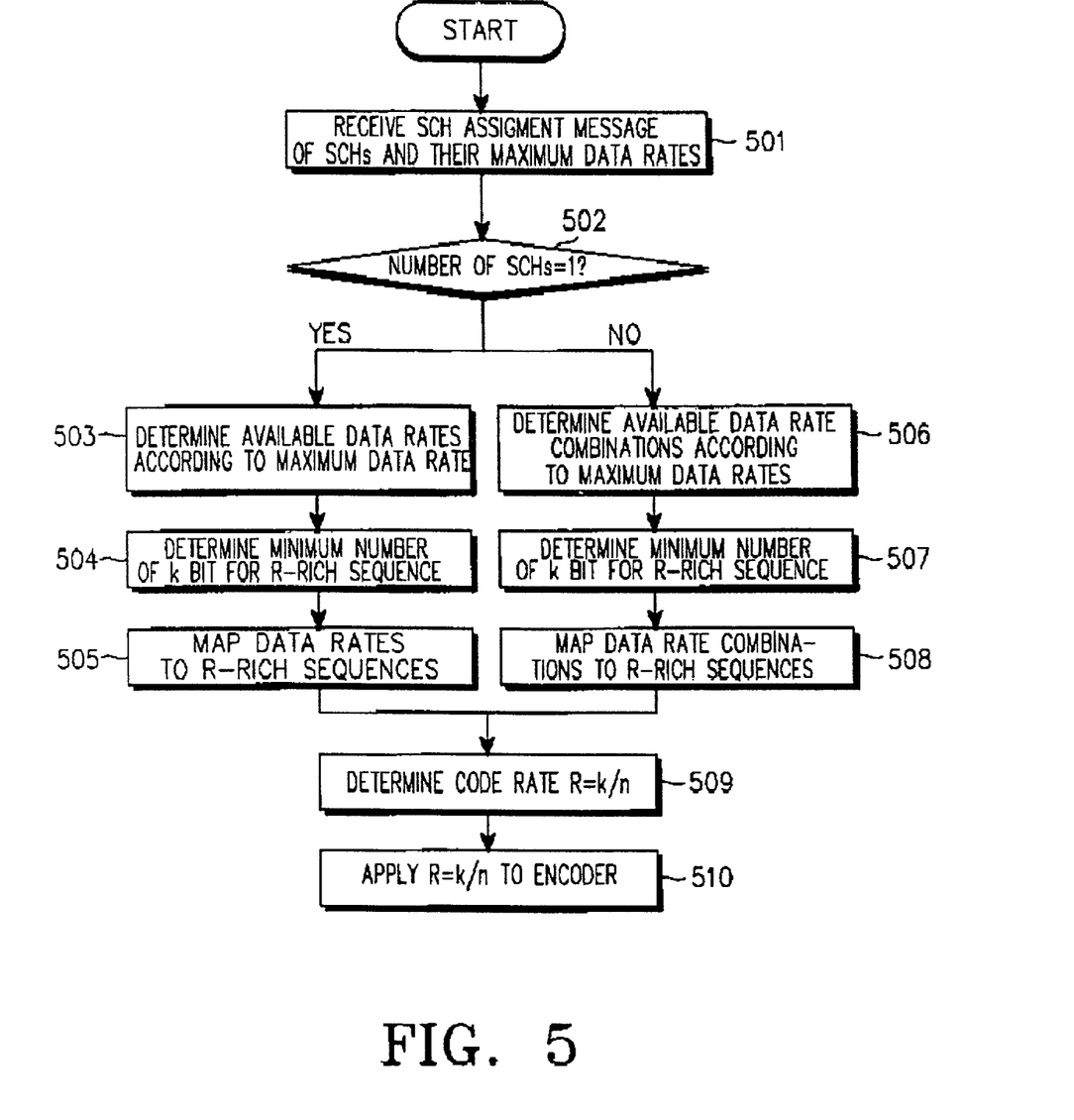
FIG. 5 is a flowchart illustrating a data rate information generating and transmitting procedure in a mobile station according to the embodiment of the present invention.

FIG. 5 is a flowchart illustrating a procedure for transmitting data rate information in the mobile station according to the embodiment of the present invention. How the mobile station determines the number of bits of an R-RICH sequence and maps available data rates for an SCH to R-RICH sequences will be described referring to FIG. 5. This procedure is performed mainly by the controller 301 shown in FIG. 3.

Referring to FIG. 5, the mobile station receives an SCH assignment message from the base station in step 501. The SCH assignment message contains control information about the number of SCHs assigned to the mobile station and a maximum data rate for each SCH.

If a single SCH is assigned to the mobile station in step 502, the mobile station determines data rates available to the SCH in step 503. The data rates are less than or equal to the maximum data rate of the SCH. In step 504, the mobile station determines the minimum number of bits of an R-RICH sequence based on the number of available data rates by equation (1). The mobile station maps minimum number of bits for R-RICH sequences to the available data rates in step 505. In the example of Table 2, 2-bit R-RICH sequences are mapped to the available data rates.

If two SCHs are assigned to the mobile station in step 502, the mobile station determines available data rate combinations in step 506. The data rates in combination are less than or equal to the maximum data rates of the SCHs. In step 507, the mobile station determines the minimum number of bits of an R-RICH sequence based on the number of available data rate combinations by equation (1). The mobile station maps minimum number of bits R-RICH sequences to the available data rate combinations in step 507. In the example of Table 3, 3-bit R-RICH sequences are mapped to the available data rates.

In step 509, the mobile station determines a code rate according to the number of bits of the R-RICH sequence. The encoder 302 encodes an R-RICH sequence at the determined code rate R=k/n.

Available SCH data rates/data rate combinations may be mapped to R-RICH sequences in a manner other than in Tables 2 and 3 only if the mapping relation is applied commonly to the mobile station and the base station according to the number of given SCHs and a maximum data rate for each SCH.

While the R-RICH sequence transmission and reception have been described when one or two SCHs are assigned to a mobile station, the same procedures are applied to the case of using three or more SCHs.

As described above, a novel channel structure according to the present invention transmits information about a data rate/data rate combination with reduced bits from a mobile station to a base station. The resulting decrease in a used code rate improves the performance of data rate information transmission.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of generating reverse data rate indicating information in a mobile station after information about a maximum data rate available to the mobile station is received from a base station in a mobile communication system, the method comprising the steps of:
   determining the number of available reverse data rates less than or equal to the maximum data rate based on the maximum data rate information;
   determining a number of bits to be assigned to the reverse data rate indicating information according to the number of available data rates; and
   generating reverse data rate indicating information with the number of bits, mapped to the available data rates on a one-to-one basis,
   wherein the step of determining the number of bits comprises the steps of determining the number of the available data rates less than or equal to the maximum data rate among a set of given data rates, and determining the number of bits of the reverse data rate indicating information according to the number of the available data rates, and wherein if the number of the available data rates is m and the number of bits is k, k is the minimum integer equal to or greater than $\log_2(m)$.

2. The method of claim 1, further comprising the steps:
   generating reverse data rate indicating information each having the number of bits and mapped to the available data rates;
   selecting one of the available data rates; and
   encoding the reverse data rate indicating information mapped to the selected data rate at a code rate determined by the number of bits of the reverse data rate indicating information and transmitting the encoded reverse data rate indicating information.

3. A method of receiving reverse data rate indicating information from a mobile station in a base station of a mobile communication system, comprising the steps of:
   determining the number of data rates available to the mobile station less than or equal to a maximum data rate from maximum data rate information;
   determining the number of bits of the reverse data rate indicating information;
   generating reverse data rate indicating information with the number of bits, mapped to the available reverse data rates on a one-to-one basis; and
   decoding reverse data rate indicating information at a code rate determined by the number of bits of the reverse data rate indicating information, upon receipt of the reverse data rate indicating information,
   wherein the step of determining the number of bits comprises the steps of determining the number of the available data rates less than or equal to the maximum data rate among a set of given data rates, and determining the number of bits of the reverse data rate indicating information according to the number of the available data rates, and wherein if the number of the available data rates is m and the number of bits is k, k is the minimum integer equal to or greater than $\log_2(m)$.

4. The method of claim 3, further comprising the steps of:
generating reverse data rate indicating information with the number of bits, mapped to the available reverse data rates on a one-to-one basis; and
decoding reverse data rate indicating information at a code rate determined by the number of bits of the reverse data rate indicating information, upon receipt of the reverse data rate indicating information.

5. A mobile station device for generating reverse data rate indicating information in a mobile station after information about a maximum data rate available to the mobile station is received from a base station in a mobile communication system, the device comprising:
a memory for storing available reverse data rates less than or equal to the maximum data rate included the maximum data rate information; and
a controller for determining a number of bits to be assigned to the reverse data rate indicating information according to the number of available data rates, and mapping reverse data rate indicating information having the determined number of bits to the available data rates,
wherein if the number of the available data rates is m and the number of bits is k, k is determined by the controller to be the minimum integer equal to or greater than $\log_2$ (in).

6. The mobile station device of claim 5, further comprising a transmitter for transmitting the reverse data rate indicating information.

7. The mobile station device of claim 6, wherein the transmitter includes an encoder for encoding the reverse data rate indicating information at a code rate determined by the determined number of bits of the reverse data rate indicating information.

8. A base station device for receiving reverse data rate indicating information from a mobile station in a mobile communication system, comprising:
a controller for determining the number of bits of the reverse data rate indicating information according to a number of data rates available to the mobile station less than or equal to a maximum data rate; and
a decoder for decoding reverse data rate indicating information at a code rate determined by the determined number of bits of the reverse data rate indicating information sequence upon receipt of the reverse data rate indicating information,
wherein the controller determines the number of the available data rates less than or equal to the maximum data rate among a set of given data rates, and determines the number of bits of the reverse data rate indicating information according to the number of the available data rates, and
wherein if the number of the available data rates is m and the number of bits is k, k is determined by the controller to be the minimum integer equal to or greater than $\log_2$ (in).

9. The base station device of claim 8, further comprising a memory for storing the set of data rates.

10. The base station device of claim 8, wherein the controller maps reverse data rate information sequences each having the number of bits to the available data rates.

11. A method of transmitting and receiving reverse data rate indicating information in a mobile communication system having a mobile station and a base station, comprising the steps of:
transmitting information about a maximum data rate available to the mobile station from the base station to the mobile station;
determining a first number of bits for reverse data rate indicating information according to a number of available data rates less than or equal to the maximum data rate in the mobile station;
transmitting reverse data rate indicating information with the first number of bits representing a reverse data rate to be used from the mobile station to the base station;
determining a second number of bits for the reverse data rate indicating information according to the number of available data rates less than or equal to the maximum data rate in the base station; and
decoding the reverse data rate indicating information at a code rate determined by the second number of bits in the base station upon receipt of the reverse data rate indicating information from the mobile station,
wherein the first number of bits determination step comprises the steps of determining the number of the available data rates less than or equal to the maximum data rate in the mobile station among a set of given data rates, and determining the first number of bits of the reverse data rate indicating information according to the number of the available data rates, and wherein if the number of the available data rates is m and the first number of bits is k, k is the minimum integer equal to or greater than $\log_2(m)$.

12. The method of claim 11, further comprising the steps:
generating reverse data rate indicating information each having the number of bits and mapped to the available data rates;
selecting one of the available data rates; and
encoding the reverse data rate indicating information mapped to the selected data rate at a code rate determined by the number of bits of the reverse data rate indicating information and transmitting the encoded reverse data rate indicating information.

13. The method of claim 12, wherein the step of determining the second number of bits comprises the steps of determining the number of the available data rates less than or equal to the maximum data rate among a set of given data rates, and determining the second number of bits of the reverse data rate indicating information according to the number of the available data rates, and wherein if the number of the available data rates is m and the second number of bits is k, k is the minimum integer equal to or greater than $\log_2(m)$.

14. The method of claim 13, further comprising the step of generating reverse data rate indicating information with the second number of bits, mapped to the available reverse data rates on a one-to-one basis.

* * * * *